May 11, 1965 K. G. F. MOELLER 3,183,121

THERMOELECTRIC GENERATOR WITH HEAT TRANSFER AND THERMAL EXPANSION ADAPTOR

Filed June 2, 1961 3 Sheets-Sheet 1

INVENTOR

KURT G. F. MOELLER

BY Howard W. Hermann

AGENT

INVENTOR
KURT G. F. MOELLER

BY [signature]

AGENT.

May 11, 1965 K. G. F. MOELLER 3,183,121

THERMOELECTRIC GENERATOR WITH HEAT TRANSFER AND THERMAL EXPANSION ADAPTOR

Filed June 2, 1961

3 Sheets-Sheet 3

INVENTOR

KURT G. F. MOELLER

BY Howard W. Hermann

AGENT

United States Patent Office 3,183,121
Patented May 11, 1965

3,183,121
THERMOELECTRIC GENERATOR WITH HEAT TRANSFER AND THERMAL EXPANSION ADAPTOR

Kurt G. F. Moeller, Harness Creek Road, R.F.D. 3, Annapolis, Md.

Filed June 2, 1961, Ser. No. 114,570
11 Claims. (Cl. 136—4)
(Granted under Title 35, U.S. Code (1952), sec. 266)

The invention described herein may be manufactured and used by or for the Government of the United States of America for governmental purposes without the payment of any royalties thereon or therefor.

The present invention relates to thermoelectric batteries and more particularly to methods and means for enhancing electrical insulation and heat transfer characteristics of such devices to thereby increase their efficiency.

The thermoelectric battery is a device for the direct transformation of thermal energy into electrical energy. Each cell of the battery makes use of the physical phenomenon of thermoelectricity, i.e. an electrical potential is developed across a block or strip of material if opposite ends of the block are at different temperatures. Although many materials exhibit this phenomenon to some degree, the electrical potential which is produced by a given temperature differential varies greatly with different materials. Most thermoelectric elements in use at the present time are of semiconductor materials of one type or another.

A problem inherent, however, in all thermoelectric batteries is that of increasing the temperature differential between the "hot end" and the "cold end" of each of the thermoelectric elements. Obviously, if this temperature differential is increased for any given heat input to the battery, the efficiency of the battery is improved.

One type of thermoelectric battery which has been suggested provides one wall which is adapted to be placed adjacent a heat carrying duct. Another wall, spaced from the aforesaid wall is provided and is adapted to be placed in contact with a coolant. Between the pair of walls and separated from each wall by a layer of electrical insulation are placed the thermoelectric elements. By heating one wall and cooling the other it becomes possible to establish a heat differential between opposite ends of the thermoelectric element, thereby developing an electrical potential difference between the ends which may be utilized in any desired manner. At the present time, however, conventional insulating materials such as mica are used for electrically insulating the semi-conductive thermoelectric elements. Since the thermoelectrical elements have greater heat conductivity per unit cross-sectional area than mica and since the cross-sections involved have in prior art devices been generally of equal area, heat passing from the hot wall to the thermoelectric element was quickly conducted to the cool end of the thermoelectric element where it built up due to poor conductivity through the insulation to the cooling wall. Thus the temperature differential between the ends of the thermoelectric element has been limited by the amount of heat which could be carried through the insulation.

Another difficulty with conventional thermoelectric (TE) batteries is controlling the thermal stresses which occur when a cold battery is started for operation. These stresses have at times caused breakage of the battery elements.

In accordance with the present invention there are provided electrically insulating junctions, between the thermoelectric element and the hot and cold walls, which allow for maximum heat flow across the insulator. This in turn provides for a large difference in temperature between the hot and cold ends of the thermoelectric element and thereby eliminates or at least reduces substantially the problems inherent in the prior art devices. A part of the invention further provides for elimination of damage from thermal stresses.

Accordingly, it is an object of the present invention to provide a thermoelectric battery which is more efficient than the thermoelectric batteries which are presently known.

Another object is the provision of a thermoelectric battery which, though having greater efficiency than existing devices, may be manufactured by simple methods which are low in cost.

A further object is to provide a thermoelectric battery which utilizes proper and optimum proportions between the coefficients of heat conductivity and the heat transfer areas of the elements of the battery.

Still another object is the provision of a thermoelectric battery in which the temperature differential available between the heat sources and the cooling medium is utilized to the greatest possible extent by providing proper heat transfer and temperature gradients.

A still further object is the provision of a thermoelectric battery which is not subject to damage by thermal stresses.

Other objects and many of the attendant advantages of this invention will be readily appreciated as the same become better understood by reference to the following detailed description when considered in connection with the accompanying drawings wherein.

Figure 1:
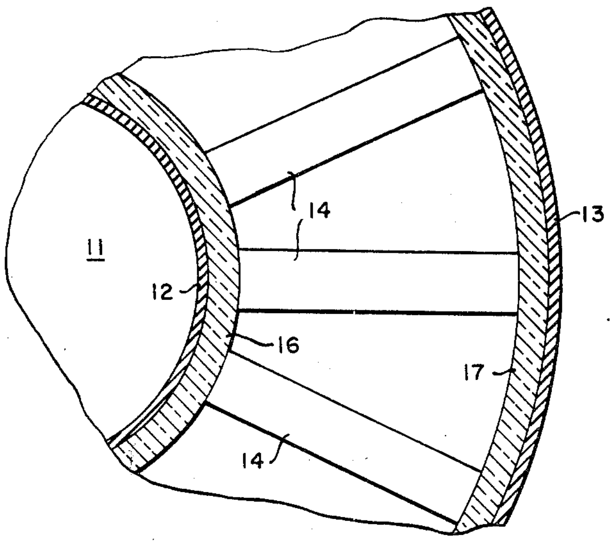
FIG. 1 is a fragmentary view in cross-section of a typical overall thermoelectric battery arrangement.

Referring now to the drawings wherein like reference characters indicate like or corresponding parts throughout the several views, there is shown in FIG. 1 a fragment of a concentrically arranged thermoelectric battery having a heat carrying duct 11 at its core. Duct 11 may carry hot gases as exhaust of a combustion process or a heated liquid which may be heated, for example, in or by a nuclear reactor. Although the duct 11 is shown as being cylindrical as defined by an inner wall 12 it will be realized that other shapes may be preferable in some particular applications.

An outer wall 13 which may be of metallic material is cooled by contact with a coolant such as air or water. Mounted between inner wall 12 and outer wall 13 are a plurality of thermoelectric elements 14 which in the concentric arrangement shown are preferably positioned radially. Interposed between inner wall 12 and thermoelectric elements 14 is a layer of electrical insulating material 16, and an outer layer of electrical insulating material 17 is placed between outer wall 13 and thermoelectric elements 14 for the purpose of electrically isolating elements 14. Heat or thermal energy, supplied to thermoelectric elements 14 from duct 11, is transmitted to the cooled outer wall 13 by the inherent conductivities of the materials through which it must pass.

Figure 2:
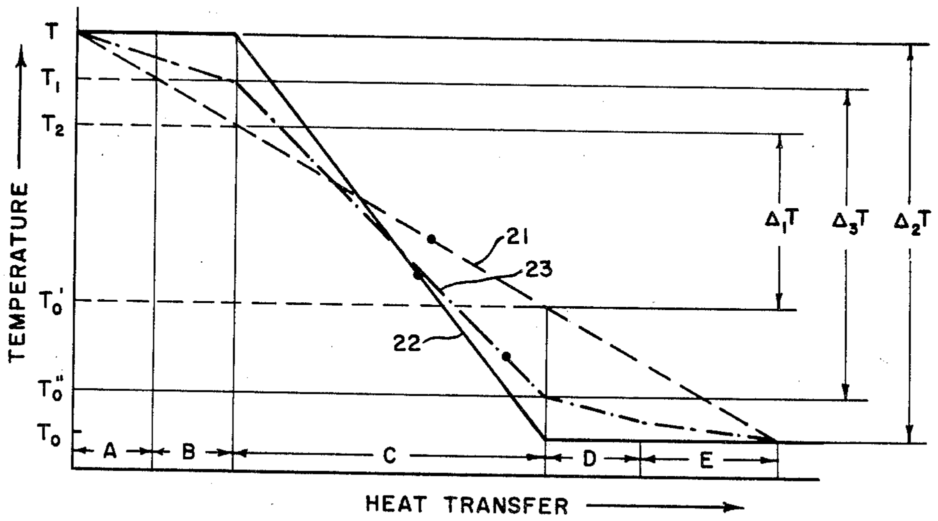
FIG. 2 is a series of plots illustrating the heat transfer characteristics of the embodiment of FIG. 1 under various conditions.

Referring now to FIG. 2, there is shown a series of graphs of heat conduction through the battery elements. The heat conductors are all in series and are marked as separate items of heat flow on the abscissa. The ordinate is marked with temperature units. A represents the heat flow from duct 11 through inner wall 12, B the heat flow through the electrical insulation layer 16 on the hot side, C the thermoelectric element 14, D the electrical insulation 17 on the cool side, and C the outer wall 13 to the coolant. T represents the temperature in duct 11, while $T_0$ represents the temperature of the coolant adjacent outer wall 13. If all elements had equal conductivity, the temperature distribution upon reaching steady state condition would be as represented by straight line 21. The overall temperature difference between the heating fluid and the cooling fluid is shown as $\Delta_2T$. However, it will be realized that the effective temperature difference which will produce an electrical potential in thermoelectric element 14 is the difference in temperature between the ends of the thermoelectric element itself, or that portion represented by C on the heat transfer scale. This difference assuming equal conductivity in all elements is represented by $\Delta_1T$, which as can be seen from the figure is less than one-half $\Delta_2T$.

The other extreme is represented by graph 22 which represents extremely high conductivity in all parts except the thermoelectric elements.

This, of course, would provide an effective differential of $\Delta_2T$ across the thermoelectric element, thus providing maximum output and efficiency for any given value of $\Delta_2T$. However, it must be realized that electrical insulation is a necessity and that there are no available materials which possess an extremely high heat conductivity and a low electrical conductivity. Therefore in actual practice the graph will be located between curves 21, and 22, for example at 23 which results in an effective temperature differential $\Delta_3T$.

Therefore it must be concluded that $\Delta_3T$ will always be less than $\Delta_2T$ but the difference of their two values must be kept as small as possible for greatest efficiency.

Present thermoelectric batteries use conventional insulating materials such as mica in the form of very thin sheets. However, the thermal conductivity of mica is 0.0018 cal. cm.$^{-1}$ sec.$^{-1}$ deg. C.$^{-1}$ while semiconductors used for the thermoelectric elements have thermal conductivities of about 0.004 cal. cm.$^{-1}$ sec.$^{-1}$ deg. C.$^{-1}$. Assuming the cross-section of the thermoelectric element and the electrical insulation are equal, this means that the TE element can carry twice as much heat away "downstream" as the insulation can supply.

Figure 3:
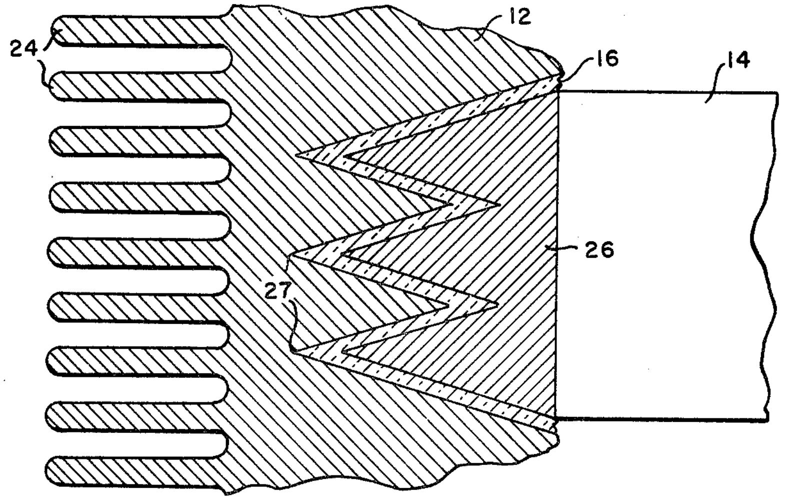
FIG. 3 is a fragmentary view in cross-section of an electrically insulated joint, between the thermoelectric element and one of the battery walls, made in accordance with the present invention.

Referring now to FIG. 3 there is shown an embodiment of the invention which alleviates this problem. In this embodiment there is shown an inner wall 12, which is preferably made of metallic material and has a series of fins 24 which increase the amount of surface which is in contact with the heating gas to thereby provide a greater exchange of heat between the wall and the heating gas. Wall 12 conducts heat to the thermoelectric element 14 by means of an adapter piece 26 which has one surface in contact with an end of thermostatic element 14 and a relatively large remaining surface area which may be provided, as shown, with a series of large serrations. Wall 12 has a receiving portion 27 which is preferably designed to receive the entire length of adapter element 26 and has a shape which is the complement thereof while providing a narrow gap 16 between the receiving portion of wall 12 and the surface portions of adapter element 26. This gap 16 is filled with a thin layer of electrical insulating material.

Again assuming that thermoelectric element 14 is of semiconductor material having a thermal conductivity of 0.004 cal. cm.$^{-1}$ sec.$^{-1}$ deg. C.$^{-1}$ and insulation material is mica which has a thermal conductivity of 0.0018 cal. cm.$^{-1}$ sec.$^{-1}$ deg. C.$^{-1}$, the advantage provided by the invention can be analyzed. If the cross-sectional area of the thermoelectric element 14 is assumed to be 1 inch$^2$, the cross-sectional area of the insulation through the gap will be, in the FIG. 3 embodiment, approximately 3.5 inches$^2$. Thus the element 14 would provide a heat flow of about 0.004 cal. cm.$^{-1}$ sec.$^{-1}$ deg. C.$^{-1}$ but since the cross-section of insulation 16 is 3.5 times larger in area, the heat flow through the mica would become 0.0063 cal. cm.$^{-1}$ sec.$^{-1}$ deg. C.$^{-1}$. Therefore, the heat conducted from fins 24 to the end of thermoelectrical element 14, assuming wall 12 and adapter element 26 are of metal having high conductivity, is greater than element 14 can conduct away. The temperature at the boundary between adapter element 26 and thermoelectric element 14 therefore rises and the temperature differential along TE element 14 increases thereby causing greater output and efficiency.

Although FIG. 3 has been described with reference to the hot end of the battery, it will be realized that a similar arrangement could also be provided at the cold end in which case the wall 12 would represent the cold wall; all other elements remaining the same. In such a case the thermoelectric element 14 is at a higher temperature than the cooling wall. Since the wall, insulation, and adapter element are capable of carrying heat away faster than the thermoelectric element can supply it the temperature of the cool end portion of thermoelectric element 14 drops, again causing greater temperature differential between the hot and cold ends of the element and again increasing the efficiency of the battery.

Figure 4:
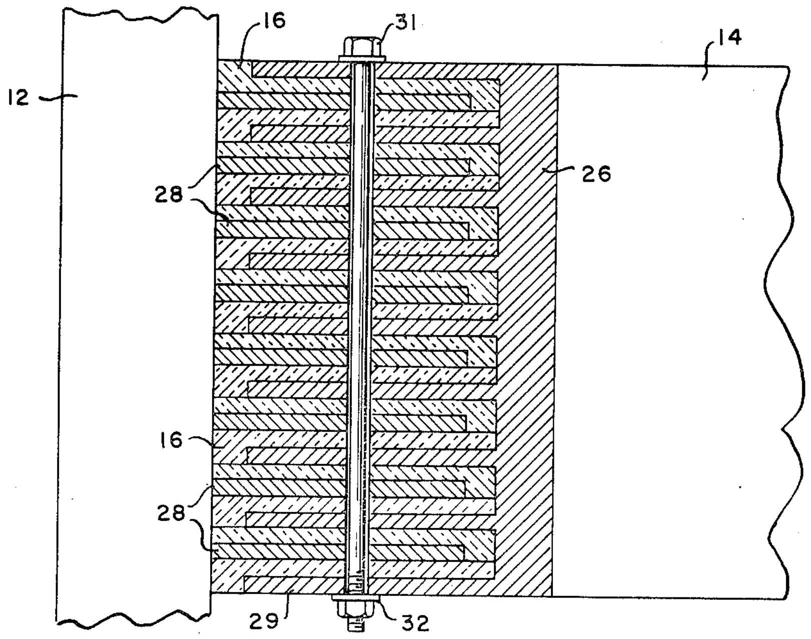
FIG. 4 is a fragmentary view of an electrically insulated joint similar to FIG. 3 and representing another embodiment of the invention.

Referring now to FIG. 4, there is shown another embodiment of the invention which provides increased cross-sectional area of insulation. In this embodiment of the invention, wall 12 is provided with a plurality of vanes 28 which may be made, for example, of sheet metal. An adapter element 26 having a flat surface in contact with thermoelectric element 14 also has a plurality of spaced vanes 29 which are positioned between vanes 28 of wall 12 and are spaced therefrom. The spaces between vanes 28 and 29 are filled with electrical insulation 16 to electrically isolate vanes 28 from vanes 29. The vanes may be secured in place and packed tightly by use of a bolt 31 which runs free through an oversized hole in each of the vanes and is secured by a nut 32.

The configuration of FIG. 4 may, for example, provide an insulation-surface-area-increase of 16 times the cross sectional area of the thermoelectric element thus increasing considerably the effective thermal conductivity of the insulation. Since more heat is conducted through the insulation and the adapter element than can be supplied or carried away by element 14, a larger temperature differential with its inherent greater efficiency is achieved.

Figure 5:
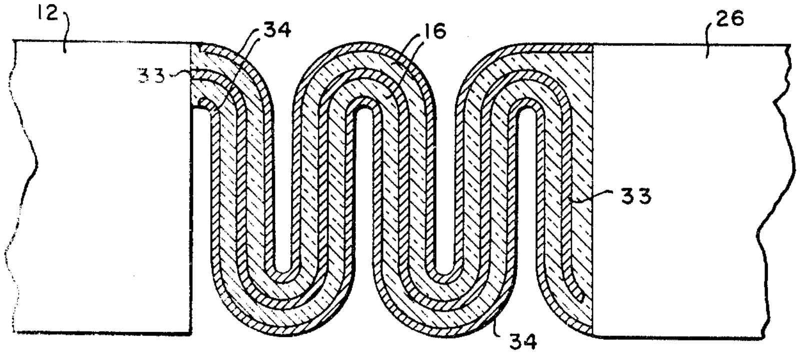
FIG. 5 is a fragmentary view of an electrically insulated joint similar to FIG. 3 and representing a further embodiment of the invention.
Figure 6:
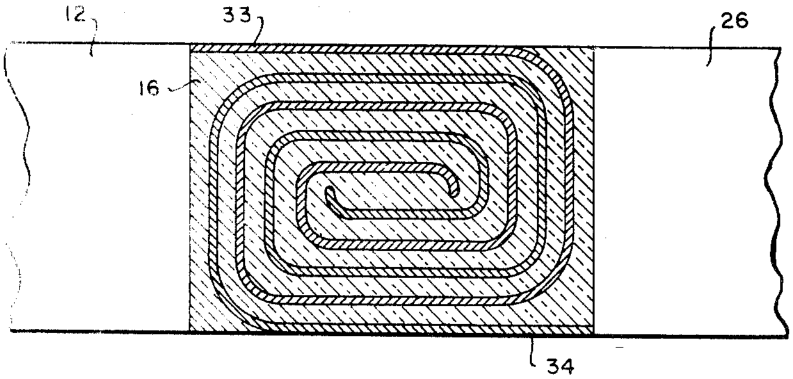
FIG. 6 is a fragmentary view of a joint similar in some respects to FIG. 3 and representing a still further embodiment of the invention.

Referring now to FIGS. 5 and 6 there are shown two embodiments where in metal strips of high thermal conductivity and of sufficiently large cross-section to provide a high rate of thermal conductance compared with the conductivity rate of the TE element are provided to increase the cross-sectional area of the insulation. In FIG. 5 which is expanded somewhat to show greater detail a single strip 33 extends from wall 12 and is folded and positioned along its length adjacent to a pair of strips 34 extending from adapter element 26. A layer of electrical insulation 16 is provided to prevent any electrical connection between the strips. FIGURE 6 is similar to FIG. 5 in that highly conductive strips are provided to increase the cross-sectional area and thereby increase the conductivity rate of the insulation. In this embodiment, however, strips 33 and 34 are rolled concentrically along with an insulation layer 16. It will be seen that such configurations may be simply fabricated. Thus, it is seen that by increasing the area of contact, the heat flow through electrically insulating material can be greatly increased.

It is understood that the figures are mere illustrations. Any dimensions in the drawings or any ratios of such dimensions are of no significance. The parameters which control the dimensions are explained in the description.

It will be realized that materials other than mica can be utilized as electrical insulation. However, most materials which are good electrical insulators are also poor heat conductors. One known electrical insulating material which is capable of fair heat conduction is quartz cut parallel to its optical axis. The thermal conductivity of quartz cut parallel to the optical axis is 0.030 cal. cm.$^{-1}$ sec.$^{-1}$ deg. C.$^{-1}$, the conductivity of quartz cut perpendicular to its axis is 0.016 cal. cm.$^{-1}$ sec.$^{-1}$ deg. C.$^{-1}$, and the conductivity of fused quartz and quartz sand is approximately 0.003 cal. cm.$^{-1}$ sec.$^{-1}$ deg. C.$^{-1}$. Quartz cut parallel to its axis is the best conductor of heat and therefore requires the smallest contact area. However, it is more expensive than an increased contact area device as disclosed above. Fused quartz is less expensive but requires more area. Quartz sand, however, can be utilized by binding it to metal surfaces and also by providing a densely packed layer to insure good thermal conductivity. Thus it will be realized that although the various embodiments of the invention have been described as using mica as an insulating material, other materials can be utilized as long as sufficient heat flow (coefficient of thermal conductivity multiplied by cross-sectional area) is maintained to provide greater heat conductivity to and from the thermoelectric element than through the thermoelectric element.

Figure 7:
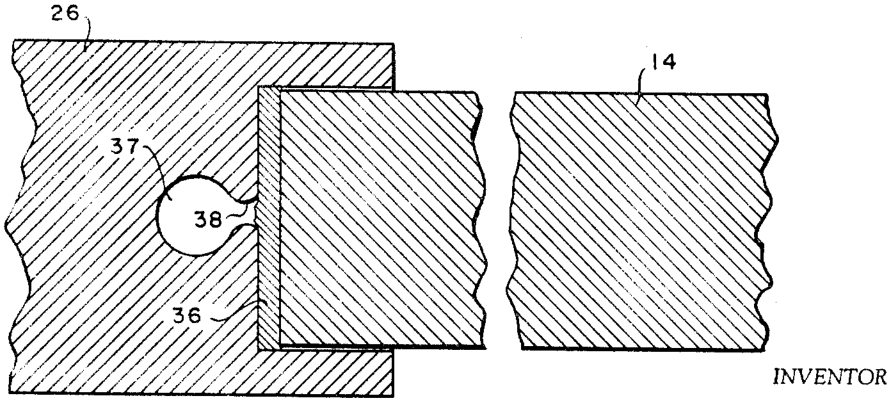
FIG. 7 is a fragmentary view of a joint between the thermoelectric element and its adapter element as utilized in any of FIGS. 1 and 3–6.

Referring now to FIG. 7 there is shown an enlarged cross-section of a joint designed to eliminate thermal stresses in each of the foregoing embodiments of the invention. It will be realized that when the battery is started for operation it is cold or of even temperature throughout. Heat enters the battery through the hot wall 12 (FIG. 1) and causes expansion of the elements as their temperatures rise. The expansion of the inner parts is met by the nonexpanding outer parts thereby generating stresses in the thermoelectric elements if no provision is made for allowing for expansion. If such stresses become sufficiently great, the thermoelectric element may be damaged. This danger is eliminated in accordance with this invention by the coupling illustrated in FIG. 7.

In FIG. 7 there is shown the hot end of a thermoelectric element 14, which may be metallized at its hot end if desired, inserted in an aperture in adapter element 26. Although obviously a space could be provided between adapter element 26 and TE element 14 to allow for expansion, maximum heat transfer can be obtained only through direct contact between the elements. This contact is provided by a suitable metal 36, which is designed to melt as its temperature approaches its operating temperature. This metallic material 36 may, for example, be Wood's metal (50% Bi, 25% Pb, 12.5% Sn, 12.5% Cd)—melting point 70° C., Tinman's solder (67% Sn, 33% Pb)—melting point 180° C., etc. depending upon temperature requirements. A cavity 37 is provided with a necked portion 38 open to metallic material 36. Thus, any relative motion between adapter element 26 and TE element 14 caused by thermal expansion, forces the molten metal 36 into neck 38 of aperture 37, thereby alleviating the pressure. Surface tension of the molten metal prevents the metal from flowing into aperture 37 so that direct contact is maintained between metal material 36 and the end of TE element 14. If desired, the battery container can be filled with an inert gas such as nitrogen to prevent oxidation of the molten metal.

Thus there has been described a thermoelectric battery which is capable of producing electrical power at greater efficiency than presently known devices. In accordance with the invention as herein disclosed the temperature differential between heat sources and cooling medium is utilized to the greatest possible extent by providing proper heat transfer and suitable temperature gradients while preventing damage due to thermal stresses in the elements. The coefficients of thermal conductivity and heat transfer areas are brought into proper and optimum proportions. The battery as described above may be simply manufactured at relatively low cost.

Obviously many modifications and variations of the present invention are possible in the light of the above teachings. It is therefore to be understood that within the scope of the appended claims the invention may be practiced otherwise than as specifically described.

What is claimed is:

1. A thermoelectric generator comprising heating means, cooling means, a thermoelectric element interposed between said heating means and said cooling means, said thermoelectric element having an end surface of predetermined area facing said heating means and an opposed end surface of predetermined area facing said cooling means, and means essentially for heat transfer interposed between said heating means and said thermoelectric element and said thermoelectric element and said cooling means, said heat transferring means comprising an adapter element having a high thermal conductivity and an electrical insulation having a high thermal conductivity, said adapter element having a main body and a first surface area of substantially the same size and configuration as said predetermined surface area of said thermoelectric element and in intimate contact therewith, and a second surface area being substantially greater than said first surface area and including portions which project from the main body of said adapter element toward said heating means and toward said cooling means and in intimate contact with said insulation in order to maximize the heat transfer between said heating means and said thermoelectric element and said thermoelectric element and said cooling means; and wherein said heating means and said cooling means include projecting portions positioned in complementary relationship to said projecting portions of said adapter element and in intimate contact with said insulation and spaced from said projecting portions of said adapter element by said insulation.

2. The invention as defined in claim 1 wherein said projecting portions of said adapter element and said heating and cooling means are triangular in cross-section, and positioned in complementary relationship to one another to thereby provide an insulation gap of substantially uniform thickness.

3. The invention as defined in claim 1 wherein said projecting portions of said adapter element and said heating and cooling means are narrow fins interleaved and prevented from contact by said insulation.

4. The invention as defined in claim 1 wherein said projecting portions of said adapter element and said heating and cooling means are narrow strips interleaved and folded but prevented from contact by said insulation.

5. The invention as defined in claim 1 wherein said projecting portions of said adapter element and said heating and cooling means are strips rolled with said insulation into a helix, said insulation preventing contact between said strips.

6. The invention as defined in claim 1 and further comprising an aperture in said adapter element, and a layer of metallic material interposed between said adapter element and said thermoelectric element for establishing contact therebetween said metallic material having a melting point below the operating temperature of said generator, said aperture having a necked portion open to said metallic material whereby thermal expansion of the elements of said generator when said generator is heated is absorbed by forcing molten metallic material into said necked portion of said aperture to thereby afford pressure relief.

7. The invention as defined in claim 6 wherein said projecting portions of said adapter element and said heating and cooling means are triangular in cross-section, and positioned in complementary relationship to one another to thereby provide an insulation gap of substantially uniform thickness.

8. The invention as defined in claim 6 wherein said projecting portions of said adapter element and said heating and cooling means are narrow fins interleaved and prevented from contact by said insulation.

9. The invention as defined in claim 6 wherein said projecting portions of said adapter element and said heating and cooling means are narrow strips interleaved and folded but prevented from contact by said insulation.

10. The invention as defined in claim 6 wherein said projecting portions of said adapter element and said heating and cooling means are strips rolled with said insulation into a helix, said insulation preventing contact between said strips.

11. A thermoelectric generator for operation in a predetermined temperature range comprising heating means, cooling means, a thermoelectric element interposed between said heating means and said cooling means, electrical insulation isolating said thermoelectric element from said heating means and from said cooling means, and expansion absorbent means interposed between said thermoelectric element and said insulation at at least one end of said thermoelectric element, said expansion absorbing means including a first member having an aperture therein, a layer of metallic material interposed adjacent said aperture for establishing contact between said insulation and said thermoelectric element, said metallic material having a melting point below the operating temperature range of said generator whereby expansion in said generator is absorbed by forcing said metallic material in its molten state into said aperture.

References Cited by the Examiner

UNITED STATES PATENTS

| | | | |
|---|---|---|---|
| 1,848,655 | 3/32 | Petrik | 136—4.2 |
| 2,734,344 | 2/56 | Lindenblad | 136—4.2 |
| 2,844,638 | 7/58 | Lindenblad | 136—4.2 |
| 2,938,357 | 5/60 | Sheckler | 136—4.2 |
| 2,992,539 | 7/61 | Curtis | 136—4.2 |
| 3,006,979 | 10/61 | Rich | 136—4.2 |

WINSTON A. DOUGLAS, *Primary Examiner.*

JOHN H. MACK, *Examiner.*